United States Patent
Christy

(10) Patent No.: US 10,479,138 B2
(45) Date of Patent: Nov. 19, 2019

(54) ELECTROMAGNETIC WHEEL ASSEMBLY

(71) Applicant: Kevin Christy, Albion, NY (US)

(72) Inventor: Kevin Christy, Albion, NY (US)

(*) Notice: Subject to any disclaimer, the term of this patent is extended or adjusted under 35 U.S.C. 154(b) by 170 days.

(21) Appl. No.: 15/839,443

(22) Filed: Dec. 12, 2017

(65) Prior Publication Data

US 2019/0176517 A1 Jun. 13, 2019

(51) Int. Cl.
*B60B 27/00* (2006.01)
*B60K 7/00* (2006.01)
*H02K 7/09* (2006.01)
*H02K 7/18* (2006.01)
*B60B 37/10* (2006.01)
*B60B 27/06* (2006.01)
*F16C 32/04* (2006.01)
*B60B 27/02* (2006.01)
*F16B 1/00* (2006.01)

(52) U.S. Cl.
CPC .......... *B60B 27/0015* (2013.01); *B60B 27/02* (2013.01); *B60B 27/06* (2013.01); *B60B 37/10* (2013.01); *B60K 7/0007* (2013.01); *F16B 1/00* (2013.01); *F16C 32/0444* (2013.01); *F16C 32/0489* (2013.01); *H02K 7/09* (2013.01); *H02K 7/1846* (2013.01); *B60K 2007/0038* (2013.01); *B60K 2007/0092* (2013.01); *B60Y 2400/423* (2013.01); *F16C 2322/39* (2013.01)

(58) Field of Classification Search
CPC ..... B60B 27/0015; B60B 27/02; B60B 27/06; B60B 37/10; H02K 7/1846; H02K 7/09; F16C 32/0444; F16C 32/0489; F16C 2322/39; B60K 7/0007; B60K 2007/0092; B60K 2007/0038

USPC .................................. 301/111.04, 111.01
See application file for complete search history.

(56) References Cited

U.S. PATENT DOCUMENTS

| 3,690,393 | A |   | 9/1972 | Guy | |
| D260,874 | S |   | 9/1981 | Reppert | |
| 4,637,488 | A | * | 1/1987 | Fotheringham | B62D 1/28 180/253 |
| 4,932,245 | A | * | 6/1990 | Shelton | G01P 3/443 324/173 |
| 5,597,058 | A | * | 1/1997 | Ewer | F16D 11/14 180/247 |
| 5,969,452 | A |   | 10/1999 | Halsey et al. | |
| 8,947,185 | B2 |   | 2/2015 | Fullerton et al. | |

(Continued)

FOREIGN PATENT DOCUMENTS

WO    WO8804072    6/1988

*Primary Examiner* — S. Joseph Morano
*Assistant Examiner* — Jean W Charleston

(57) ABSTRACT

An electromagnetic wheel assembly includes a spindle that may be rotatably coupled to an axle of a vehicle. A wheel is removably positioned on the spindle. A hub is provided and the spindle is rotatably positioned in the hub. An electromagnet is coupled to the hub. The electromagnet is selectively turned on to magnetically engage the wheel thereby retaining the wheel on the disk. The electromagnet is embedded within the disk. A lock is movably coupled to the spindle. The lock is selectively urged into a locking position to inhibit the wheel from coming off of the spindle when the electromagnet fails. Additionally, the lock is selectively urged into an unlocked position to facilitate the wheel to be removed from the spindle.

18 Claims, 4 Drawing Sheets

(56) References Cited

U.S. PATENT DOCUMENTS

| | | | | |
|---|---|---|---|---|
| 2006/0175893 A1* | 8/2006 | White | ................ | B60B 27/02 |
| | | | | 301/108.1 |
| 2011/0291468 A1* | 12/2011 | Rieger | ................ | B60B 27/0005 |
| | | | | 301/105.1 |
| 2015/0145363 A1* | 5/2015 | Haile | ................ | B60B 27/02 |
| | | | | 310/90.5 |

* cited by examiner

ELECTROMAGNETIC WHEEL ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to wheel devices and more particularly pertains to a new wheel device for retaining a wheel on a vehicle without fasteners.

BRIEF SUMMARY OF THE INVENTION

An embodiment of the disclosure meets the needs presented above by generally comprising a spindle that may be rotatably coupled to an axle of a vehicle. A wheel is removably positioned on the spindle. A hub is provided and the spindle is rotatably positioned in the hub. An electromagnet is coupled to the hub. The electromagnet is selectively turned on to magnetically engage the wheel thereby retaining the wheel on the disk. The electromagnet is embedded within the disk. A lock is movably coupled to the spindle. The lock is selectively urged into a locking position to inhibit the wheel from coming off of the spindle when the electromagnet fails. Additionally, the lock is selectively urged into an unlocked position to facilitate the wheel to be removed from the spindle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
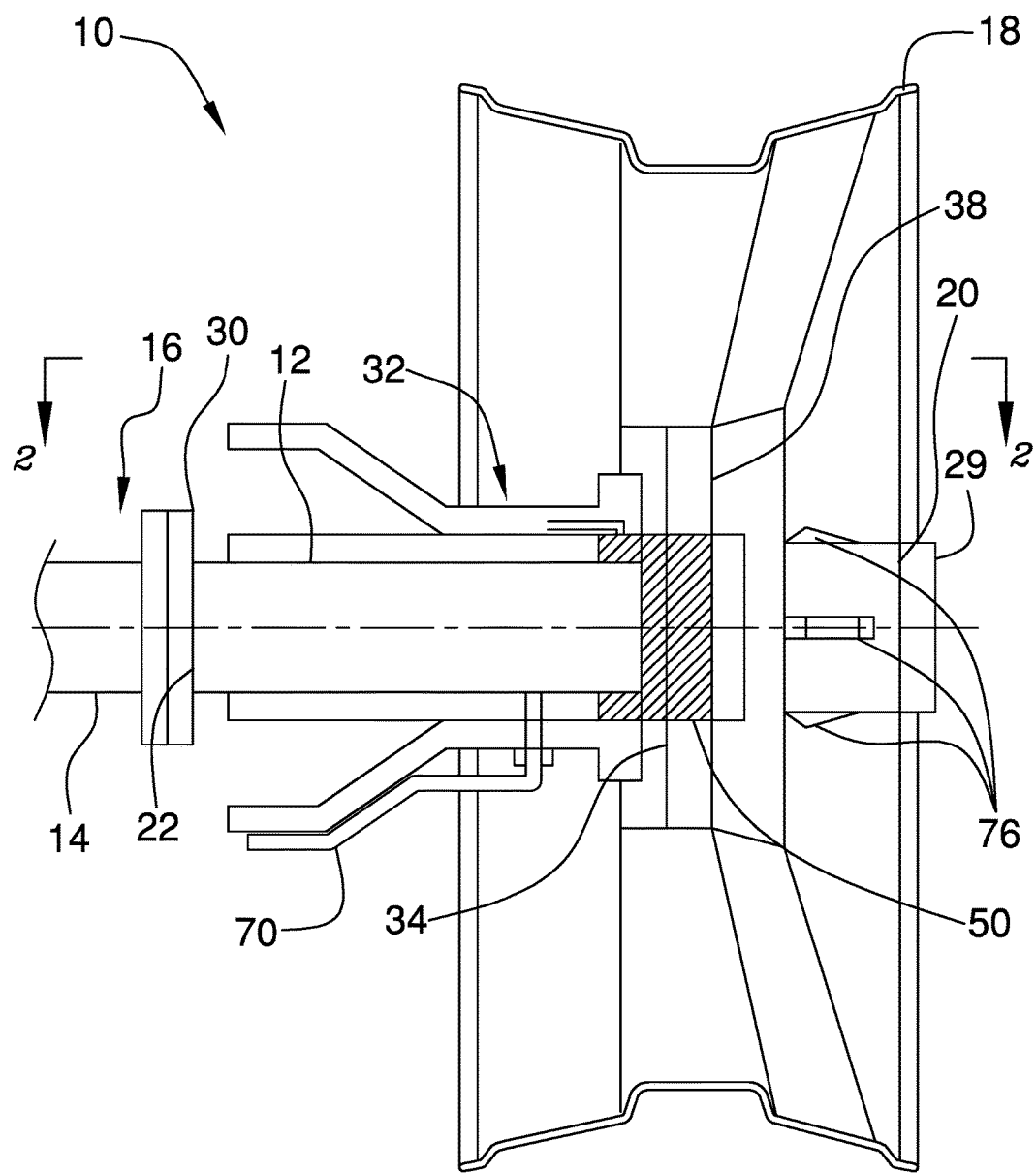
FIG. 1 is a perspective cut-away view of an electromagnetic wheel assembly according to an embodiment of the disclosure.
Figure 2:
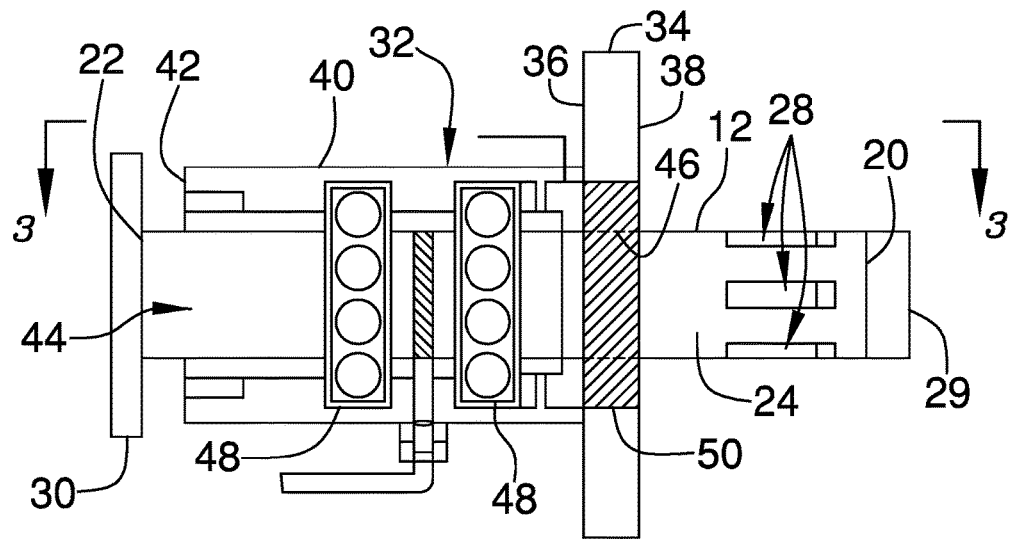
FIG. 2 is a cross sectional view taken along line 2-2 of FIG. 1 of an embodiment of the disclosure.
Figure 3:
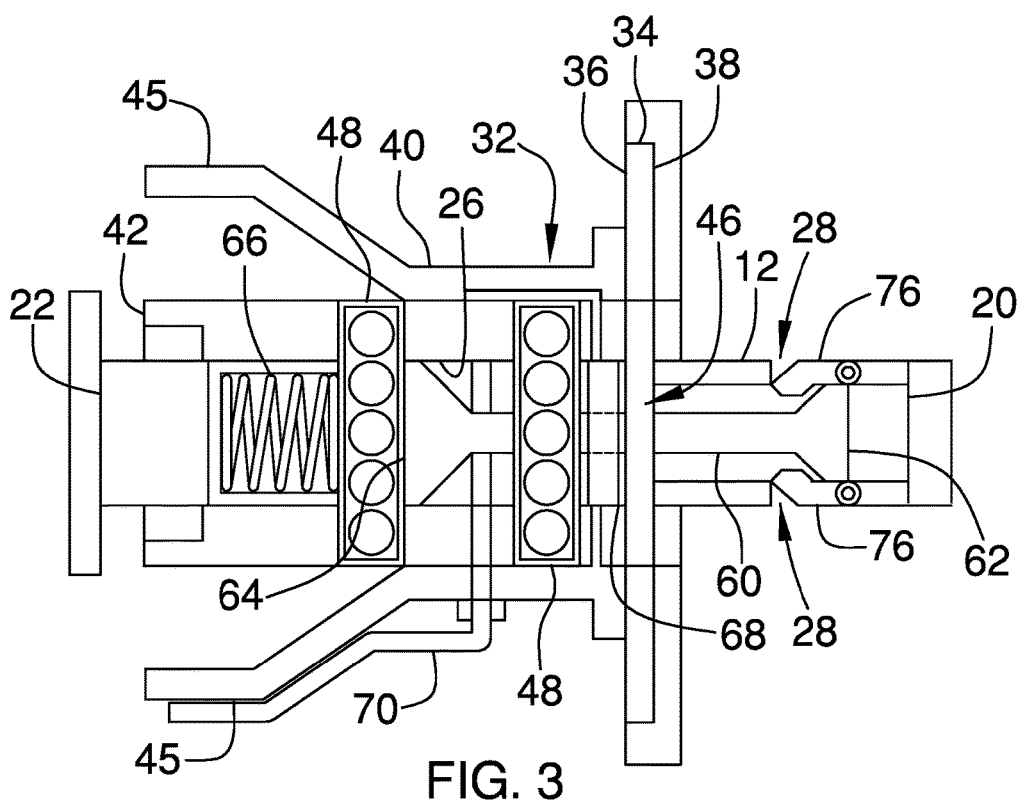
FIG. 3 is a cross sectional view taken along line 3-3 of FIG. 2 of an embodiment of the disclosure.
Figure 4:
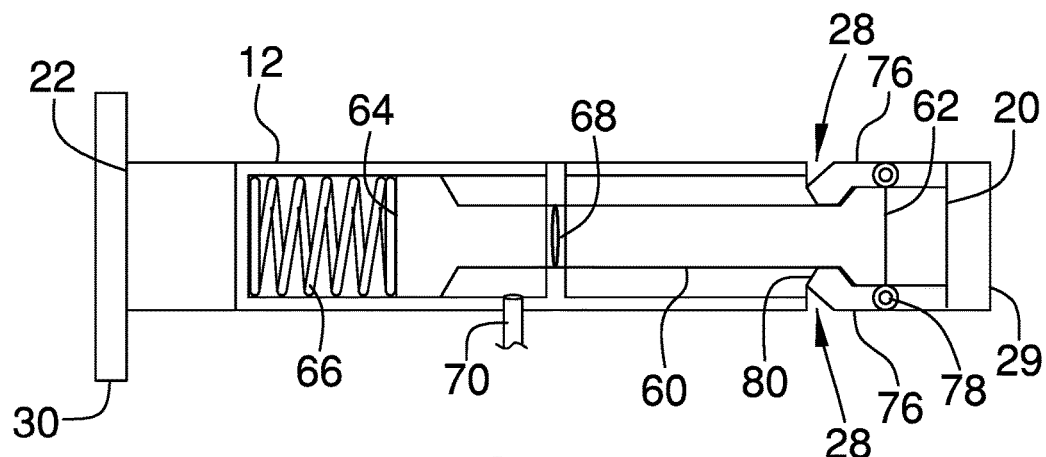
FIG. 4 is a perspective cut-away view of a lock of an embodiment of the disclosure in a first position.
Figure 5:
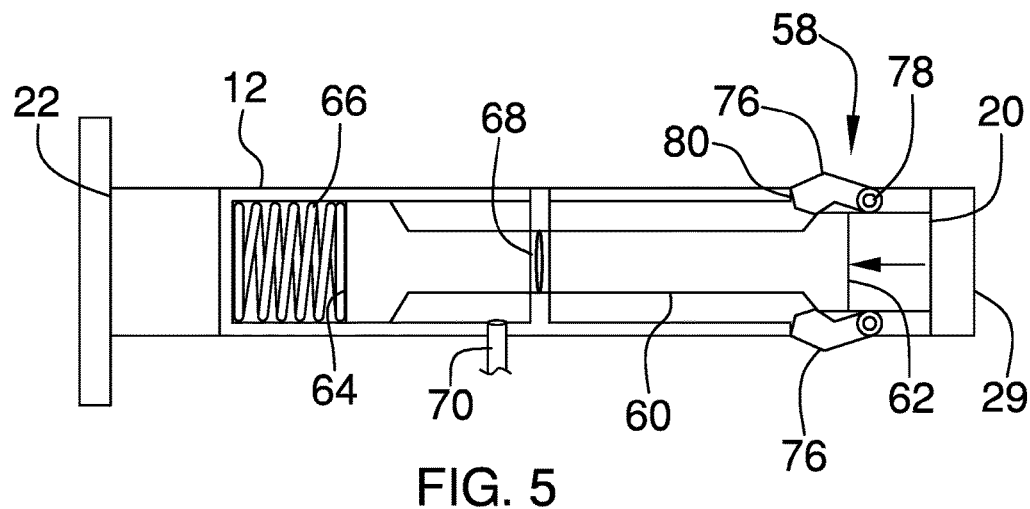
FIG. 5 is a perspective cut-away view of a lock of an embodiment of the disclosure in a second position.
Figure 6:
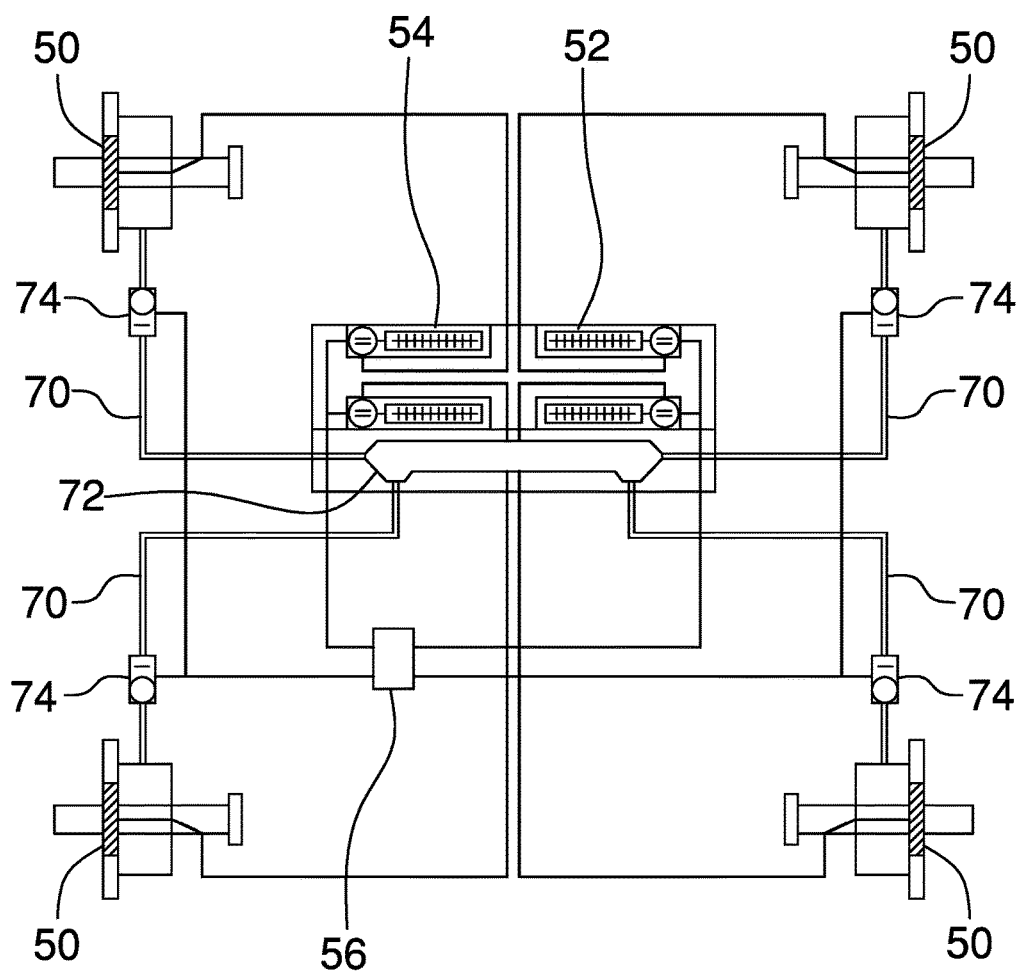
FIG. 6 is a schematic view of an embodiment of the disclosure.

With reference now to the drawings, and in particular to FIGS. 1 through 6 thereof, a new wheel device embodying the principles and concepts of an embodiment of the disclosure and generally designated by the reference numeral 10 will be described.

As best illustrated in FIGS. 1 through 6, the electromagnetic wheel assembly 10 generally comprises a spindle 12 that may be rotatably coupled to an axle 14 of a vehicle 16. A wheel 18 is removably positioned on the spindle 12. The vehicle 16 may be a passenger vehicle, a racing vehicle and any other type of vehicle 16 that has removable wheels. The wheel 18 may be comprised of a magnetic material such as steel or the like.

The spindle 12 has a first end 20, a second end 22 and an outer wall 24 extending therebetween. The spindle 12 is elongated between the first 20 and second 22 ends and the spindle 12 is substantially hollow. The outer wall 24 has an interior surface 26. The outer wall 24 has a plurality of slots 28 and each of the slots 28 extends into an interior of the spindle 12. Each of the slots 28 is oriented to extend from the first end 20 toward the second end 22. Moreover, each of the slots 28 is positioned closer to the first end 20 than the second end 22. The slots 28 are spaced apart from each other and are distributed around the spindle 12. The first end 20 of the spindle 12 may be open and a cap 29 may be removably coupled to the first end 20 of the spindle 12.

A flange 30 is coupled to the second end 22 of the spindle 12. The flange 30 is removably coupled to the axle 14 having the spindle 12 being oriented collinear with the axle 14. The flange 30 may be an axle flange of any conventional design and the flange 30 may be coupled to an axle flange that is positioned on the axle 14. In this way the spindle 12 may be coupled to existing, conventional axle shafts in vehicles.

A hub 32 is provided and the spindle 12 is rotatably positioned in the hub 32. The hub 32 is coupled to a suspension of the vehicle 16. The hub 32 comprises a disk 34 that has a first surface 36 and a second surface 38. The wheel 18 abuts the second surface 38 of the disk 34 when the wheel 18 is positioned on the spindle 12. A sleeve 40 is coupled to and extends away from the first surface 36 of the disk 34. The sleeve 40 has a distal edge 42 with respect to the disk 34 forming an opening 44 into the sleeve 40. The hub 32 may include a pair of trailing arms 45.

The disk 34 has an aperture 46 extending through the first 36 and second 38 surfaces and the aperture 46 is aligned with the sleeve 40. The opening 44 in the sleeve 40 insertably receives the spindle 12 having the spindle 12 extending outwardly through the aperture 46. A pair of bearings 48 is provided and each of the bearings 48 is positioned in the sleeve 40. Each of the bearings 48 is continuous such that each of the bearings 48 forms a closed loop. The spindle 12 extends through each of the bearings 48 such that spindle 12 are retained in a center of the hub 32. Each of the bearings 48 may be friction reducing ball bearings or the like.

An electromagnet 50 is provided and the electromagnet is coupled to the hub 32. The electromagnet 50 is selectively turned on to magnetically engage the wheel 18 thereby retaining the wheel 18 on the disk 34. In this way the wheel 18 is removably coupled to the hub 32 without using fasteners, such as lug bolts or the like common to vehicle wheels. The electromagnet 50 is embedded within the disk 34 and the electromagnet 50 is in electrical communication with the disk 34.

A power supply 52 is provided and the power supply 52 is coupled to the vehicle 16. The power supply 52 is electrically coupled to the electromagnet 50 and the power supply 52 may comprise at least one battery 54. Additionally, the at least one battery 54 may have an operational voltage of at least 24.0 VDC. Thus, the electromagnet 50 has a power source that is independent from the vehicle's electrical system.

A control 56 is provided and the control 56 is positioned in the vehicle 16 thereby facilitating the control 56 to be manipulated. The control 56 is electrically coupled to the electromagnet 50 such that the control 56 turns the electromagnet 50 on and off. The control 56 may be an electronic control system of that is capable of monitoring and controlling the electromagnet 56 and the control 56 is coupled to the power supply 52. The control 56 may be positioned on a dashboard in the vehicle 16 or other location that is accessible to a driver of the vehicle 16.

A lock 58 is provided and the lock 58 is movably coupled to the spindle 12. The lock 58 is selectively urged into a locking position to engage the wheel 18. In this way the lock 58 inhibits the wheel 18 from coming off of the spindle 12 when the electromagnet 50 fails. The lock 58 is selectively urged into an unlocked position to facilitate the wheel 18 to be removed from the spindle 12.

The lock 58 comprises a plunger 60 that has a first end 62 and a second end 64. Each of the first end 62 and the second end 64 of the plunger 60 flares outwardly from the plunger 60. The plunger 60 is slidably positioned within the spindle 12 having each of the first 62 and second ends 64 of the plunger 60 frictionally engaging the interior surface 26 of the outer wall 24 of the spindle 12. Moreover, the plunger 60 forms a fluid impermeable seal with the spindle 12. The plunger 60 may be a hydraulic plunger 60 or the like.

A biasing member 66 is positioned between the second end 22 of the spindle 12 and the second end 64 of the plunger 60. The biasing member 66 biases the plunger 60 into a first position having the second end 64 of the plunger 60 being urged away from the second end 22 of the spindle 12. The biasing member 66 may be a spring or the like. A seal 68 is positioned within the spindle 12 and the plunger 60 extends through the seal 68. The seal 68 forms a fluid impermeable seal with the spindle 12 and the plunger 60. Additionally, the seal 68 is positioned between the first end 62 and the second end 64 of the plunger 60. The seal 68 may be a hydraulic piston seal or the like.

A hydraulic line 70 is fluidly coupled to the spindle 12 such that the hydraulic line 70 is in fluid communication with the interior of the spindle 12. The hydraulic line 70 is fluidly coupled to a hydraulic pump 72, such as the power steering pump on the vehicle 16 or a dedicated hydraulic pump that is driven the vehicle's engine. The hydraulic line 70 selectively directs hydraulic fluid into spindle 12 between the second end 64 of the plunger 60 and the seal 68. Moreover, the plunger 60 is urged into a second position when the hydraulic fluid is directed into the spindle 12 such that the second end 64 of the plunger 60 is urged toward the second end 22 of the spindle 12.

A valve 74 is fluidly coupled between the hydraulic line 70 and the hydraulic pump 72. The valve 74 is electrically coupled to the vehicle's electrical system such that the valve 74 has a power source that is independent from the electromagnet 50. Moreover, the valve 74 is electrically coupled to the control 56 such that the control 56 turns the valve 74 on and off. The valve 74 closes when the valve 74 is turned off thereby inhibiting hydraulic fluid from entering the spindle 12. Moreover, the valve 74 releases hydraulic pressure in the spindle 12 when the valve 74 is turned off. In this way the biasing member 66 urges the plunger 60 into the first position.

The valve 74 opens when the valve 74 is turned on thereby allowing hydraulic fluid to enter the spindle 12. In this way the hydraulic fluid urges the plunger 60 into the second position. The valve 74 may be an electrically controlled hydraulic valve or the like. The valve 74 is turned on when the electromagnet 50 is turned on. Thus, the locks act as a fail safe to retain the wheel 18 on the spindle 12 when the electromagnet 50 fails.

A plurality of fingers 76 is provided and each of the fingers 76 has a first end 78 and a second end 80. The first end 78 corresponding to each of the fingers 76 is pivotally coupled to the outer wall 24 of the spindle 12. Moreover, each of the fingers 76 is positioned in an associated one of the slots 28 in the spindle 12. The first end 62 of the plunger 60 is positioned between the fingers 76 and the first end 20 of the spindle 12 when the plunger 60 is in the first position. Thus, the plunger 60 does not contact the fingers 76 thereby allowing the fingers 76 to rest in the associated slot. In this way each of the fingers 76 is inhibited from engaging the wheel 18 thereby facilitating the wheel 18 to be removed from the spindle 12.

The first end 62 of the plunger 60 engages the second end 80 corresponding to each of the fingers 76 when the plunger 60 is in the second position. Thus, the plunger 60 urges each of the fingers 76 to extend outwardly from the associated slot 28. In this way each of the fingers 76 engages the wheel 18 thereby inhibiting the wheel 18 from being removed from the spindle 12. The spindle 12, hub 32, electromagnet 50 and lock 58 may be present at all four wheel locations on the vehicle 16.

In use, the wheel 18 is positioned on the spindle 12 and the control 56 is manipulated to turn the electromagnet 50 and the lock 58 on. The electromagnet 50 magnetically engages the wheel 18 and the lock 58 engages wheel. Thus, the wheel 18 is retained on the spindle 12 without the use fasteners. The control 56 is selectively manipulated to turn the electromagnet 50 and the lock 58 off. Thus, the wheel 18 is removable from the spindle 12. In this way the wheel 18 may be more quickly removed compared to wheels mounted with a fastener, such as a nut or a bolt. Additionally, the electromagnet 50 and lock 58 facilitate enhanced pit crew performance in competitive racing, such as Formula and Nascar where repeated tire replacements are common.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An electromagnetic wheel assembly being configured to be electromagnetically coupled to a vehicle thereby facilitating a fastener-free coupling of a wheel to a vehicle, said assembly comprising:
  a spindle being configured to be rotatably coupled to an axle of a vehicle, said spindle being configured to have a wheel positioned thereon;
  a hub, said hub having a disk, said hub having said spindle being rotatably positioned therein, said hub being configured to be coupled to a suspension of the vehicle;
  an electromagnet being coupled to said hub, said electromagnet being selectively turned on wherein said electromagnet is configured to magnetically engage the wheel thereby retaining the wheel on said disk, said electromagnet being embedded within said disk; and
  a lock being movably coupled to said spindle, said lock being selectively urged into a locking position wherein said lock is configured to inhibit the wheel from coming off of said spindle when said electromagnet fails, said lock being selectively urged into an unlocked position wherein said lock is configured to facilitate the wheel to be removed from said spindle.

2. The assembly according to claim 1, wherein said spindle has a first end, a second end and an outer wall extending therebetween, said spindle being elongated between said first and second ends, said spindle being substantially hollow, said outer wall having an interior surface.

3. The assembly according to claim 2, wherein said outer wall has a plurality of slots, each of said slots extending into an interior of said spindle, each of said slots being oriented to extend from said first end toward said second end, each of said slots being positioned closer to said first end than said second end, said slots being spaced apart from each other and being distributed around said spindle.

4. The assembly according to claim 2, further comprising a flange being coupled to said second end of said spindle wherein said flange is coupled to be coupled to the axle having said spindle being oriented collinear with the axle.

5. The assembly according to claim 1, wherein said hub comprises said disk having a first surface and a second surface, said second surface of said disk being configured to abut the wheel when the wheel is positioned on said spindle.

6. The assembly according to claim 5, further comprising a sleeve being coupled to and extending away from said first surface of said disk, said sleeve having a distal edge with respect to said disk forming an opening into said sleeve.

7. The assembly according to claim 6, wherein said disk has an aperture extending through said first and second surfaces, said aperture being aligned with said sleeve, said opening in said sleeve insertably receiving said spindle having said spindle extending outwardly through said aperture.

8. The assembly according to claim 6, further comprising a pair of bearings, each of said bearings being positioned in said sleeve, each of said bearings being continuous such that each of said bearings forms a closed loop, said spindle extending through each of said bearings such that spindle is retained in a center of said hub.

9. The assembly according to claim 1, further comprising:
  a power supply being configured to be coupled to the vehicle, said power supply being electrically coupled to said electromagnet; and
  a control being configured to be positioned in the vehicle thereby facilitating said control to be manipulated, said control being electrically coupled to said electromagnet such that said control turns said electromagnet on and off.

10. The assembly according to claim 1, wherein said lock comprises a plunger having a first end and a second end, each of said first end and said second end flaring outwardly from said plunger, said plunger being slidably positioned within said spindle having each of said first and second ends frictionally engaging an interior surface of said outer wall of said spindle such that plunger forms a fluid impermeable seal with said spindle.

11. The assembly according to claim 10, further comprising a biasing member being positioned between a second end of said spindle and said second end of said plunger such that said biasing member biases said plunger into a first position having said second end of said plunger being urged away from said second end of said spindle.

12. The assembly according to claim 10, further comprising a seal being positioned within said spindle, said plunger extending through said seal such that said seal forms a fluid impermeable seal with said spindle, said seal being positioned between said first end and said second end of said plunger.

13. The assembly according to claim 12, further comprising a hydraulic line being fluidly coupled to said spindle such that said hydraulic line is in fluid communication with said interior of said spindle, said hydraulic line being configured to be fluidly coupled to a hydraulic pump, said hydraulic line being configured to selectively direct hydraulic fluid into spindle between said second end of said plunger and said seal.

14. The assembly according to claim 13, wherein said plunger is urged into a second position when the hydraulic fluid is directed into said spindle such that said second end of said plunger is urged toward said second end of said spindle.

15. The assembly according to claim 14, further comprising a plurality of fingers, each of said fingers having a first end and a second end, said first end corresponding to each of said fingers being pivotally coupled to an outer wall of said spindle.

16. The assembly according to claim 15, wherein:
said outer wall of said spindle has a plurality of slots; and
each of said fingers is positioned in an associated one of said slots in said spindle, said first end of said plunger being positioned between said fingers and a first end of said spindle when said plunger is in said first position such that each of said fingers rests in said associated slot wherein each of said fingers is configured to be inhibited from engaging the wheel thereby facilitating the wheel to be removed from said spindle.

17. The assembly according to claim 16, wherein said first end of said plunger engages said second end corresponding to each of said fingers when said plunger is in said second position such that each of said fingers extends outwardly from said associated slot wherein each of said fingers is configured to engage the wheel thereby inhibiting the wheel from being removed from said spindle.

18. An electromagnetic wheel assembly being configured to be electromagnetically coupled to a vehicle thereby facilitating a fastener-free coupling of a wheel to a vehicle, said assembly comprising:
    a spindle being configured to be rotatably coupled to an axle of a vehicle, said spindle being configured to have a wheel positioned thereon, said spindle having a first end, a second end and an outer wall extending therebetween, said spindle being elongated between said first and second ends, said spindle being substantially hollow, said outer wall having an interior surface, said outer wall having a plurality of slots, each of said slots extending into an interior of said spindle, each of said slots being oriented to extend from said first end toward said second end, each of said slots being positioned closer to said first end than said second end, said slots being spaced apart from each other and being distributed around said spindle;
    a flange being coupled to said second end of said spindle wherein said flange is coupled to be coupled to the axle having said spindle being oriented collinear with the axle;
    a hub having said spindle being rotatably positioned therein, said hub being configured to be coupled to a suspension of the vehicle, said hub comprising:
        a disk having a first surface and a second surface, said second surface of said disk being configured to abut the wheel when the wheel is positioned on said spindle,
        a sleeve being coupled to and extending away from said first surface of said disk, said sleeve having a distal edge with respect to said disk forming an opening into said sleeve, said disk having an aperture extending through said first and second surfaces, said aperture being aligned with said sleeve, said opening in said sleeve insertably receiving said spindle having said spindle extending outwardly through said aperture, and
        a pair of bearings, each of said bearings being positioned in said sleeve, each of said bearings being continuous such that each of said bearings forms a closed loop, said spindle extending through each of said bearings such that spindle is retained in a center of said hub;
    an electromagnet being coupled to said hub, said electromagnet being selectively turned on wherein said electromagnet is configured to magnetically engage the wheel thereby retaining the wheel on said disk, said electromagnet being embedded within said disk;
    a power supply being configured to be coupled to the vehicle, said power supply being electrically coupled to said electromagnet;
    a control being configured to be positioned in the vehicle thereby facilitating said control to be manipulated, said control being electrically coupled to said electromagnet such that said control turns said electromagnet on and off; and
    a lock being movably coupled to said spindle, said lock being selectively urged into a locking position wherein said lock is configured to inhibit the wheel from coming off of said spindle when said electromagnet fails, said lock being selectively urged into an unlocked position wherein said lock is configured to facilitate the wheel to be removed from said spindle, said lock comprising:
        a plunger having a first end and a second end, each of said first end and said second end of said plunger flaring outwardly from said plunger, said plunger being slidably positioned within said spindle having each of said first and second ends of said plunger frictionally engaging said interior surface of said outer wall of said spindle such that plunger forms a fluid impermeable seal with said spindle,
        a biasing member being positioned between said second end of said spindle and said second end of said plunger such that said biasing member biases said plunger into a first position having aid second end of said plunger being urged away from said second end of said spindle,
        a seal being positioned within said spindle, said plunger extending through said seal such that said seal forms a fluid impermeable seal with said spindle, said seal being positioned between said first end and said second end of said plunger,
        a hydraulic line being fluidly coupled to said spindle such that said hydraulic line is in fluid communication with said interior of said spindle, said hydraulic line being configured to be fluidly coupled to a hydraulic pump, said hydraulic line being configured to selectively direct hydraulic fluid into spindle between said second end of said plunger and said seal, said plunger being urged into a second position when the hydraulic fluid is directed into said spindle such that said second end of said plunger is urged toward said second end of said spindle, and
        a plurality of fingers, each of said fingers having a first end and a second end, said first end corresponding to each of said fingers being pivotally coupled to said outer wall of said spindle, each of said fingers being positioned in an associated one of said slots in said spindle, said first end of said plunger being positioned between said fingers and said first end of said spindle when said plunger is in said first position such that each of said fingers rests in said associated slot wherein each of said fingers is configured to be inhibited from engaging the wheel thereby facilitating the wheel to be removed from said spindle, said first end of said plunger engaging said second end corresponding to each of said fingers when said plunger is in said second position such that each of said fingers extends outwardly from said associated slot wherein each of said fingers is configured to engage the wheel thereby inhibiting the wheel from being removed from said spindle.

* * * * *